(12) United States Patent
Oh

(10) Patent No.: US 6,332,590 B1
(45) Date of Patent: Dec. 25, 2001

(54) PHOTOEMISSION BASED SPACECRAFT CHARGING SENSOR

(75) Inventor: David Oh, Sunnyvale, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/219,805

(22) Filed: Dec. 23, 1998

(51) Int. Cl.[7] .................................................. B64G 1/00
(52) U.S. Cl. ................................................... 244/158 R
(58) Field of Search ........................ 246/158 R, 1 A, 246/171; 250/394

(56) References Cited

U.S. PATENT DOCUMENTS

| | | | |
|---|---|---|---|
| 3,415,992 | * | 12/1968 | Webb ..................................... 244/171 |
| 3,450,879 | * | 6/1969 | Seppi ..................................... 244/171 |
| 3,529,161 | * | 9/1970 | Oosthoek et al. . | |
| 3,984,730 | * | 10/1976 | Hunter ............................. 244/158 R |
| 4,005,357 | * | 1/1977 | Parkinson ............................. 244/1 A |
| 4,804,848 | * | 2/1989 | Horiba et al. ......................... 250/394 |

OTHER PUBLICATIONS

Mullen et al, "An Autonomous Charge Control System at Geosynchronous Altitude" IEEE, vol. 34, No. 6, Dec. 1997.*

Katz et al, "Mechanism for Spacecraft Charging Initiated Destruction of Solar Arrays in GEO", AIAA, 1998.*

* cited by examiner

Primary Examiner—Galen L. Barefoot
(74) Attorney, Agent, or Firm—Kenneth W. Float

(57) ABSTRACT

A charging sensor that uses photoemission to directly measure the electrical potential of a spacecraft in orbit relative to the space environment. The photoemission based charging sensor uses photoemission from a photoemitting conductive plate of a charge probe as a reference point for voltage readings and provides direct measurements of spacecraft charging.

20 Claims, 1 Drawing Sheet

PHOTOEMISSION BASED SPACECRAFT CHARGING SENSOR

BACKGROUND

The present invention relates generally to spacecraft, and more particularly, to a photoemission based spacecraft charging sensor for use on spacecraft.

Previously developed charge plates measured the buildup of charge on an electrically isolated dielectric surface. Although this produces voltage data, there is no available voltage reference. As a result, the data produced cannot be easily convened to a spacecraft charging measurement.

A surface charging detector (or charge plate) has heretofore been developed and flown by Lockheed Martin (formerly Martin Marietta). This surface charging detector is described in an article entitled "Integrated Environmental Monitoring System for Spacecraft."

This paper describes an integrated space environmental monitoring system for geosynchronous satellites. The system provides measurements of surface charging, internal charging, and total dose radiation from the space environment. There are two components of the system, including an internal charge monitor and a surface charge detector. The surface charging monitor measures charging by magnetospheric plasma electrons from 3 keV to 20 keV and with worst-case current density from 0.1 to 1 $nA/cm^2$. The surface charge detector has two components, including a charging plate and control electronics. The charging plate is mounted to the spacecraft structure outside the spacecraft and is exposed directly to the space environment.

However, this prior art monitoring system does not directly measure the electrical potential of a spacecraft in orbit relative to the space environment. Furthermore, this prior art monitoring system does not use photoemission from a photoemitting metal plate as a reference point for voltage readings or provide direct measurements of spacecraft charging.

It would be therefore be advantageous to have an improved photoemission based spacecraft charging sensor for use on spacecraft.

SUMMARY OF THE INVENTION

The present invention comprises a charging sensor that uses photoemission to directly measure the electrical potential of a spacecraft in orbit relative to the space environment. The photoemission based charging sensor uses photoemission from a photoemitting conductive (metal) plate to create a reference point for voltage readings and provides direct measurements of spacecraft charging. Conventional devices have lacked such a reference point.

The charging sensor includes a charge probe and probe electronics coupled between the charge probe and a ground plane of the spacecraft. The charge probe comprises the photoemitting conductive plate which is isolated from the body of the spacecraft. The charge probe measures charge accumulation on the spacecraft by measuring the potential of the spacecraft relative to ambient plasma surrounding the spacecraft.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which.

DETAILED DESCRIPTION

Figure 1:
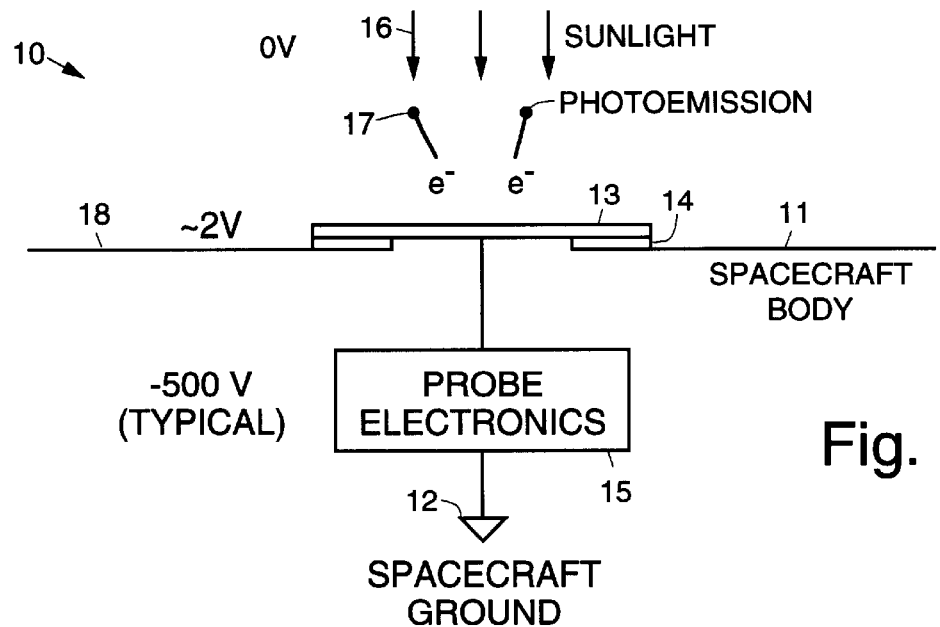
FIG. 1 illustrates an exemplary charge probe used in a charge sensor in accordance with the principles of the present invention.

Referring to the drawing figures, FIG. 1 illustrates an exemplary charge probe 10 used in a charge sensor 20 in accordance with the principles of the present invention. The charge probe 10 and charge sensor 20 are designed for use on a spacecraft 11, such as an FS 1300 spacecraft 11, developed by the assignee of the present invention.

The charge probe 10 comprises a conductive metal plate 13, such as an aluminum or gold plate 13 which is isolated (insulated) from the body of the spacecraft 11 by means of an insulative adhesive 14, for example. The metal plate 13 is coupled to probe electronics 15 which are coupled to the ground plane 12 of the spacecraft 11. The charge probe 10 and charge sensor 20 measures the potential of the spacecraft 11 relative to the ambient plasma surrounding the spacecraft 11, and thus determines charge accumulation on the spacecraft 11.

During solar substorms, the spacecraft 11 tends to collect negative charge from the surrounding plasma. The spacecraft 11 can charge several hundred volts negative to its surroundings in a period of minutes. A typical spacecraft could use two charge probes 10 for redundancy in combination with additional charging probes of differing design. The charge probe 10 measures the potential difference between the ground plane of the spacecraft 11 and the isolated metal (aluminum) plate 13 mounted on a sun facing surface of a solar array 18, for example, on the spacecraft 11.

Aluminum is a strong photo-emitter. Alternative conductive photoemitting materials may also be used, including metals such as gold, for example. When exposed to sunlight 16, the isolated metal plate 13 emits 17 electrons ($e^-$) and its potential starts to rise with respect to its surroundings. Once the potential of the metal plate 13 rises above the potential of the surrounding plasma, any electrons ($e^-$) that are emitted are attracted back to the surface of the metal plate 13. The result is illustrated in the generic I–V curve shown in FIG. 2.

Figure 2:
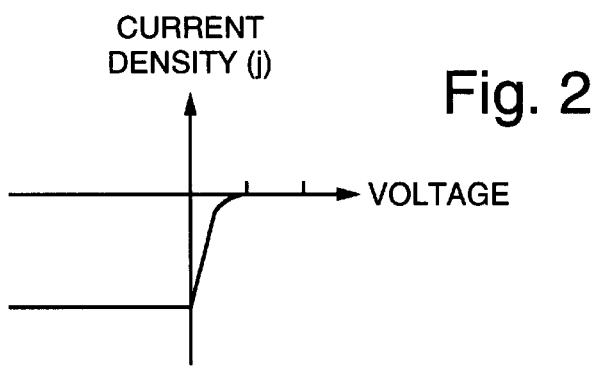
FIG. 2 illustrates an I–V curve for photoemission of aluminum.

With reference to FIG. 2, since the current drops rapidly at positive voltages, the metal plate 13 sits a few volts positive of its surroundings. The charge sensor 20 measures the potential of the spacecraft 11 by measuring the voltage difference between the metal plate 13 and the ground plane 12 of the spacecraft 11. The measured value is proportional to the actual potential of the spacecraft 11. The charge sensor 20 measures relatively large negative voltages (up to 1000 V) at very low currents.

The unique aspect of the design of the charge sensor 20 relative to previous designs is that the photoemitting metal plate 13 is used as a reference for the voltage measurement. The photoemission effectively "clamps" the potential of the metal plate 13 to the potential of the surrounding environment. As a result, measurements of the potential between the metal plate 13 and the body of the spacecraft 11 are a direct measurement of the potential between the spacecraft 11 and the environment around the metal plate 13. If the metal plate 13 is located in the middle of a panel of solar cells of a solar array 18, for example, the metal plate 13 measures the voltage between the body of the spacecraft 11 and solar cell cover glass surrounding the metal plate 13.

Figure 3:
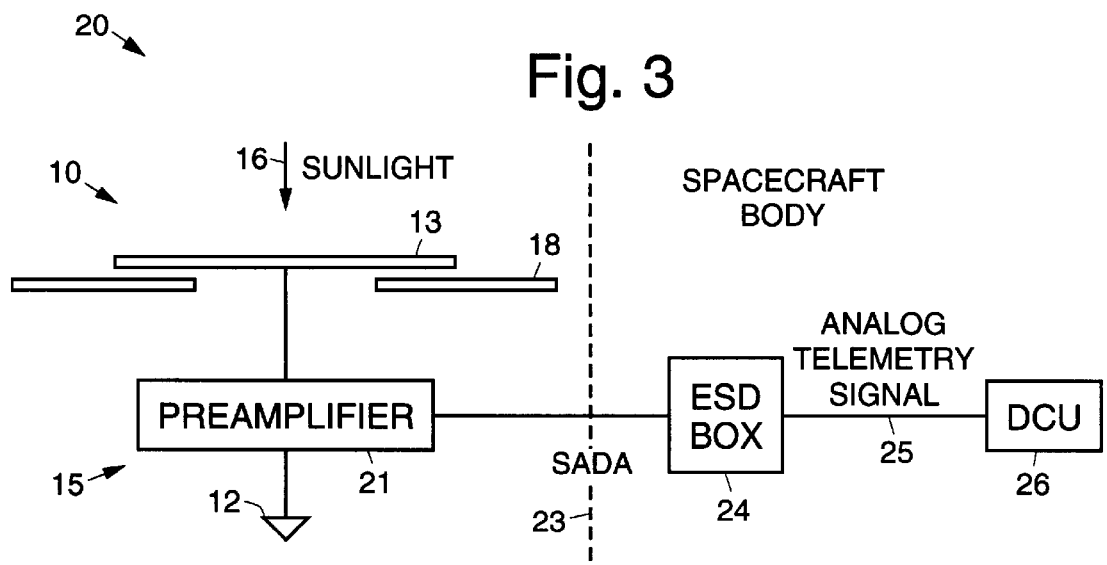
FIG. 3 illustrates an exemplary charge sensor in accordance with the principles of the present invention.

FIG. 3 illustrates an exemplary charge sensor 20 in accordance with the principles of the present invention. The charge sensor 20 comprises the charge probe 10, which includes a preamplifier 21 that is coupled between the metal plate 13 and the ground plane 12 of the spacecraft 11. The metal plate 13 is disposed adjacent to and insulated from the solar array 18. The preamplifier 21 is coupled to an electrostatic discharge (ESD) suppression circuit 24. The ESD protection unit 24 outputs an analog telemetry signal 25 to a data collecting unit (DCU) 26 (or computer 26) on the spacecraft 11. The preamplifier 21 is disposed relatively close to the metal plate 13. The electrostatic discharge suppression circuit 24 and data collecting unit 26 are disposed within the body of the spacecraft 11. The electrostatic discharge suppression circuit 24 and data collecting unit 26 are connected via a wire running through a solar array drive assembly (SADA) on the spacecraft 11.

An exemplary voltage probe 10 and charge sensor 20 for use on an FS1300 spacecraft 11 that was reduced to practice has the following characteristics. The location of the metal plate 13 is preferably adjacent to the center panel of the solar array 18, next to a center holddown of the solar array 18. This minimizes interaction with the body of the spacecraft 11 and maximizes illumination. One voltage probe 10 is located on each solar array 18 (two per spacecraft 11). The lifetime of the exemplary voltage probe 10 and charge sensor 20 is estimated to be from 2 to 15 years.

Photoemission current density ($j_P$) is 42 mA/m² measured for an aluminum plate 13 with naturally occurring oxide. The size of the metal plate 13 is 1.2 inches by 1.2 inches. The total measured current ($I_s$) is between 0–39 mA. The duty cycle of the exemplary voltage probe 10 and charge sensor 20 is continuous when it is sunlit, and does not operation during eclipse periods. The output of the exemplary charge sensor 20 is a standard analog telemetry signal. The measurable voltage range for the exemplary charge sensor 20 is −1000 Volts to +50 Volts.

The use of the charge probe 10 and charge sensor 20 of the present invention may be used to verify and correlate simulations of the spacecraft 11. The charge probe 10 and charge sensor 20 may also be used to provide data for anomaly investigations and aid in the design and verification of charge control measures taken on present or future spacecraft 11.

Thus, a photoemission based spacecraft charging probe and sensor for use on spacecraft has been disclosed. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

What is claimed is:

1. A charge sensor for use with a spacecraft, comprising:

a charge probe comprising a photoemitting conductive plate isolated from the body of the spacecraft, the photoemitting conductive plate providing a reference for voltage measurements; and probe electronics coupled between the charge probe and a ground plane of the spacecraft;

and wherein photoemission from the conductive plate clamps the potential of the conductive plate to the potential of the ambient plasma surrounding the probe so that measurements of the potential between the conductive plate and the spacecraft are a direct measurement of the potential between the spacecraft and the ambient plasma surrounding the conductive plate, the charge probe and sensor measuring the potential of the spacecraft relative to ambient plasma surrounding the probe which corresponds to charge accumulation on the spacecraft.

2. The charge sensor recited in claim 1 wherein the photoemitting conductive plate comprises aluminum.

3. The charge sensor recited in claim 1 wherein the photoemitting conductive plate comprises gold.

4. The charge sensor recited in claim 1 wherein the photoemitting conductive plate is isolated from the body of the spacecraft using an insulating adhesive.

5. The charge sensor recited in claim 1 wherein the probe electronics comprises a preamplifier.

6. The charge sensor recited in claim 1 which comprises two voltage probes.

7. The charge sensor recited in claim 1 wherein the photoemitting conductive plate is disposed on a sun facing surface of a solar array on the spacecraft.

8. The charge sensor recited in claim 1 wherein the photoemitting conductive plate is used as a reference for the voltage measurement.

9. The charge sensor recited in claim 1 wherein photoemission of the photoemitting conductive plate effectively clamps the potential of the conductive plate to the potential of the ambient plasma surrounding the spacecraft.

10. The charge sensor recited in claim 1 further comprising an electrostatic discharge suppression circuit that outputs an analog telemetry signal to a data collection unit.

11. Apparatus comprising:

a spacecraft;

a solar array disposed on the spacecraft;

a charge probe comprising a photoemitting conductive plate disposed in an isolated relationship with respect to the solar array, the photoemitting conductive plate providing a reference for voltage measurements; and probe electronics coupled between the charge probe and a ground plane of the spacecraft;

and wherein photoemission from the conductive plate clamps the potential of the conductive plate to the potential of the ambient plasma surrounding the probe so that measurements of the potential between the conductive plate and the spacecraft are a direct measurement of the potential between the spacecraft and the ambient plasma surrounding the conductive plate, the charge probe measuring to the potential of the spacecraft relative to ambient plasma surrounding the spacecraft which corresponds to charge accumulation on the spacecraft.

12. The apparatus recited in claim 11 wherein the photoemitting conductive plate comprises aluminum.

13. The apparatus recited in claim 11 wherein the photoemitting conductive plate comprises gold.

14. The apparatus recited in claim 11 wherein the photoemitting conductive plate is isolated from the body of the spacecraft using an insulating adhesive.

15. The apparatus recited in claim 11 wherein the probe electronics comprises a preamplifier.

16. The apparatus recited in claim 11 which comprises two voltage probes.

17. The apparatus recited in claim 11 wherein the photoemitting conductive plate is disposed on a sun facing surface of a solar array on the spacecraft.

18. The apparatus recited in claim 11 wherein the photoemitting conductive plate is used as a reference for the voltage measurement.

19. The apparatus recited in claim 11 wherein photoemission of the photoemitting conductive plate effectively clamps the potential of the conductive plate to the potential of the ambient plasma surrounding the spacecraft.

20. The apparatus recited in claim 11 further comprising an electrostatic discharge suppression circuit that outputs an analog telemetry signal to a data collection unit.

\* \* \* \* \*